United States Patent [19]
Handyside et al.

[11] Patent Number: 5,461,089
[45] Date of Patent: Oct. 24, 1995

[54] POWDER COATING COMPOSITIONS AND PROCESS FOR THE MANUFACTURE THEREOF

[75] Inventors: Timothy M. Handyside, Newcastle upon Tyne; Andrew R. Morgan, Tyne & Wear, both of England

[73] Assignee: Courtaulds Coatings (Holdings) Limited, London, United Kingdom

[21] Appl. No.: 958,125

[22] PCT Filed: Jul. 1, 1991

[86] PCT No.: PCT/GB91/01069

§ 371 Date: Dec. 28, 1992

§ 102(e) Date: Dec. 28, 1992

[87] PCT Pub. No.: WO92/00342

PCT Pub. Date: Jan. 9, 1992

[30] Foreign Application Priority Data

Jul. 2, 1990 [GB] United Kingdom ............ 9014646

[51] Int. Cl.[6] .................... B29B 9/00; C08J 3/12
[52] U.S. Cl. .................... 523/171; 264/8; 264/9; 264/12; 264/349; 264/443; 264/489; 264/491; 427/600; 427/195; 524/599; 524/904
[58] Field of Search ............... 264/5, 8, 9, 10, 264/13, 11, 12, 349, 25, 26; 425/8; 427/421, 445, 600, 195; 106/285; 523/171; 524/599, 904

[56] References Cited

U.S. PATENT DOCUMENTS

| | | | |
|---|---|---|---|
| 2,439,772 | 4/1948 | Gow | 264/8 |
| 3,272,893 | 9/1966 | Mogensen | 264/8 |
| 3,962,491 | 6/1976 | Sato et al. | |
| 4,599,294 | 7/1986 | Matsumoto et al. | 264/8 |

FOREIGN PATENT DOCUMENTS

| | | | |
|---|---|---|---|
| 0372860A1 | 6/1990 | European Pat. Off. | |
| 2656330C2 | 6/1978 | Germany | |
| 57-29505 | 2/1982 | Japan | 264/8 |
| 59-204621 | 11/1984 | Japan | 264/8 |
| 517394 | 7/1976 | U.S.S.R. | 425/8 |
| 1046065 | 10/1966 | United Kingdom | |

*Primary Examiner*—Mathieu D. Vargot
*Attorney, Agent, or Firm*—Nixon & Vanderhye

[57] ABSTRACT

Compositions suitable for application in powder coating processes are produced by melt atomisation of thermosettable mixtures. The product is characterised by improved particle size distribution and by a generally rounded particle shape.

24 Claims, 5 Drawing Sheets

POWDER COATING COMPOSITIONS AND PROCESS FOR THE MANUFACTURE THEREOF

This invention relates to powder coating compositions and to their preparation.

BACKGROUND OF THE INVENTION

Powder coatings form a rapidly growing sector of the coatings market. Powder coatings are solid compositions which are generally applied by an electrostatic spray process in which the powder coating particles are electrostatically charged by the spray gun and the substrate is earthed or oppositely charged. The composition is then heated to melt and fuse the particles and to cure the coating. The powder coating particles which do not adhere to the substrate can be recovered for re-use so that powder coatings are economical in use of ingredients. Also, powder coating compositions are generally free of added solvents and, in particular, do not use organic solvents and are accordingly nonpolluting.

Powder coating compositions generally comprise a solid film-forming resin, usually with one or more colouring agents such as pigments. They are usually thermosetting, incorporating, for example, a film-forming polymer and a corresponding curing agent (which may itself be another film-forming polymer). Powder coating compositions are generally prepared by intimately mixing the ingredients, for example in an extruder, at a temperature above the softening point of the film-forming polymer(s) but below a temperature at which significant pre-reaction would occur. The extrudate is usually rolled into a flat sheet and comminuted, for example by grinding, to the desired particle size. The particle size distribution required for most commercial electrostatic spray apparatus is between 10 and 120 microns, with a mean particle size within the range of 15 to 75 microns, preferably 25–50 microns.

Whilst existing processes for the manufacture of powder coating compositions are satisfactory in some respects, there is nevertheless room for improvement and it is a general objective of the present invention to simplify the production of such compositions and also to make such production more economic.

DETAILED DESCRIPTION OF THE INVENTION

The present invention provides a process for the manufacture of a thermosetting powder coating composition, which comprises forming a molten mixture of a film-forming polymer containing reactive functional groups, a curing agent for the said polymer and optionally one or more colouring agents, atomising the resulting melt into droplet form, and causing or allowing the atomised droplets to cool to form solid powder particles, the conditions being controlled to avoid significant thermosetting of the composition during the process, whereby the product composition is suitable for application as a powder coating.

It is a specific objective of the process of the invention to produce, without comminution, a composition which is suitable for application as a powder coating, and it will be appreciated that the attainment of that objective depends on the prevention of any significant thermosetting of the composition during the process. On the basis of the present state of knowledge, it could not have been expected that the necessary performance criteria for a powder coating composition could be achieved by any process involving atomisation of a molten thermosetting material and no such process would have come into consideration on the basis of previous knowledge or proposals. Thus, it would on the contrary have been expected that the temperature conditions required in order to bring the composition to a form in which it could be atomised would inevitably result in significant thermosetting of the composition; that is to say, it would have been expected that thermosetting would proceed to a degree which would produce an unacceptably detrimental effect on the product.

By avoiding the need for a comminution step, the process of the present invention achieves its general objective of simplifying the manufacture of powder coating compositions. The process of the invention at the same time avoids certain disadvantages in terms of the size distribution and shape of particles produced by previously proposed comminution processes. In terms of particle size, the product of the present invention may be controlled to have a significantly narrower variation in size as compared with comminution products, and the invention may also be used to reduce the proportion of undesired undersize particles.

In terms of shape, the process of the invention tends to produce particles which are rounded and approximate more closely to spherical shape, as distinct from the much more angular (for example, acicular) particles produced by conventional comminution techniques. The fact that the product particles are more rounded in shape is believed to have advantages in terms of retention of electrostatic charge in powder coating application processes. Thus, it would be expected that there would be significantly more charge leakage from an acicular or other angular particle.

The greater regularity of shape, in combination with narrower particle size distribution, obtainable by the process of the invention is considered to result in a product which is more readily fluidizable, especially at low particle sizes, than products obtained by comminution.

In terms of aspect ratio it should be noted that the aspect ratio of the product particles will in general approximate more closely to spherical form than those produced by comminution processes, and generally at least 70% of the particles will have an aspect ratio (length to smallest diameter) of less than 2:1, as determined by optical microscopy.

The process of the invention has the further advantage that the powder coating particles produced generally have a surface which consists substantially wholly of film-forming polymer. Colouring agents and other additives are encapsulated within the particle. This allows more rapid and even fusion when the powder coating is cured on the substrate.

It has also been observed that, at least in some instances, a proportion of the powder coating particles produced by the process of the invention may have a hollow core. The use of such hollow particles offers the possibility of producing thinner coating films than those produced by solid particles of similar dimensions when applied under similar conditions.

The film-forming polymer used in the manufacture of a thermosetting powder coating composition according to the invention is advantageously other than a phenolformaldehyde resin and may be one or more selected from carboxy-functional polyester resins, hydroxy-functional polyester resins, epoxy resins, and functional acrylic resins.

As already noted, powder coating compositions do not use organic solvents, and it is an important feature of the process of the invention that substantially no solvent is to be added to the composition at any stage, and moreover that the content of residual solvent derived from the manufacture of any of the ingredients should be as low as possible. Thus, the residual solvent content of the composition prior to atomisation should advantageously be no more than 1.0% by weight, preferably no more than 0.5% by weight, and more especially no more than 0.3% by weight.

The powder coating composition can, for example, be based on a solid polymeric binder system comprising a carboxy-functional polyester film-forming resin used with a with a polyepoxide curing agent. Such carboxy-functional polyester systems are currently the most widely used powder coatings materials. The polyester generally has an acid value in the range 10–100, a number average molecular weight Mn of 1,500 to 10,000 and a glass transition temperature Tg of from 30° C. to 85° C., preferably at least 40° C. The polyepoxide can, for example, be a low molecular weight trifunctional epoxy compound such as triglycidyl isocyanurate (TGIC) or an epoxy resin such as a condensed glycidyl ether of bisphenol A. Such a carboxyfunctional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehyde resin, or a glycol ural formaldehyde resin, for example, the material "Powderlink 1174" supplied by the Cyanamid Company, or hexahydroxymethyl melamine. A blocked isocyanate curing agent for a hydroxy-functional polyester may, for example, be internally blocked, such as the uret dione type, or may be of the caprolactam-blocked type, for example, isopherone diisocyanate.

As a further possibility, an epoxy resin can be used with an amine-functional curing agent such as, for example, dicyandiamide. Instead of an amine-functional curing agent for an epoxy resin, a phenolic material may be used, preferably a material formed by reaction of epichlorohydrin with an excess of hisphenol A (that is to say, a poly phenol made by adducting bisphenol A and an epoxy resin). A functional acrylic resin, for example a carboxy-, nydroxy- or epoxyfunctional resin can be used with an appropriate curing agent. Mixtures of binders can be used, for example a carboxy-functional polyester can be used with a carboxy functional acrylic resin and a curing agent such as a bis(beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy- or hydroxy-functional). Such resin combinations may be selected so as to be co-curing, for example, a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy functional acrylic resin).

A powder coating composition of the invention may be free from added colouring agents, but usually contains one or more such agents (pigments or dyes) and can contain additives such as a flow-promoting agent, a plasticiser, a stabiliser, for example a stabiliser against UV degradation, an anti-gassing agent, such as benzoin, a filler, or two or more such additives may be present in the coating composition. Examples of pigments which can be used are inorganic pigments such as titanium dioxide, red and yellow iron oxides, chrome pigments and carbon black and organic pigments such as, for example, phthalocyanine, azo, anthraquinone, thioindigo, isodibenzanthrone, triphendioxane and quinacridone pigments, vat dye pigments and lakes of acid, basic and mordant dyestuffs. Dyes can be used instead of or as well as pigments.

A pigment content of <40% by weight of the total composition may be used. Usually a pigment content of 25–30% is used, although opacity can be obtained with dark colours with <10% by weight of pigment. Where appropriate, a filler may be used to assist opacity, whilst minimising costs.

In many cases, it will be preferable for the powder coating composition to include a small quantity of a catalyst for the curing reaction. Preferably, however, to prevent or at least reduce undesirable pre-reaction, the catalyst is not incorporated in the composition before or during the melt mixing step of the process. Instead, the catalyst is advantageously introduced, preferably in liquid form, immediately before the flowing melt reaches the atomiser or is injected directly into the atomiser itself, so as to be mixed with the molten film-forming polymer before the onset of droplet formation. Some of the materials suitable as catalysts are liquid at room temperature; others will require heating to render them liquid. Examples of suitable catalysts include stannous octoate, dibutyltin laurate, triphenylphosphine, imidazoles such as that sold under the trade name "Curezol", phenylimidazoline, tertiary amines such as, for example, benzyldimethyl amine, tetrabutylammonium bromide, and amines blocked with boron trichloride (for example, the material known as DY 9577 available from Ciba-Geigy AG). Mention should also be made of phosphonium salts, more especially phosphonium halides, for example, benzyltriethyl phosphonium chloride or triphenylethyl phosphonium bromide. It will be appreciated that some of the foregoing materials listed as catalysts may also serve as curing agents in the case of certain polymers, especially oxirane-containing polymers.

In certain cases, it may be possible and advantageous to incorporate the catalyst in the form of a masterbatch comprising polymer and catalyst. Thus, for example, the catalyst may be dispersed in a polymer (for example, a polyester) with which it does not react, and the resulting masterbatch may be heated to form a melt before being incorporated with the remainder of the thermosetting composition immediately before atomisation.

In a typical process according to the invention, the curing agent for the film-forming polymer will be incorporated in a melt-mixing operation before the melt reaches the atomiser. In principle, however, as in the case of the catalyst referred to above, at least a proportion of the curing agent may be introduced immediately before the flowing melt reaches the atomiser or may be injected directly into the atomiser itself, so as to be mixed with the molten film-forming polymer before the onset of droplet formation.

Formation of the molten composition mixture may be carried out in any suitable melt-mixing apparatus, for example, a triple-roll mill, a Banbury mixer or a Z-plate mixer. Preferably, however, the mixing is carried out in an extruder, which has the advantage that the melt mixing is then a continuous process and will also serve to transport the melt to the next downstream stage of the process. If appropriate (as will usually be the case, for example, if an extruder is used as melt-mixing device) the components of the powder coating composition may be pre-mixed at ambient temperature before being fed to the melt-mixing device.

In one form of process according to the invention, the molten composition mixture may be formed in a mixer arranged immediately upstream of the atomiser. Examples of mixers which may be used in such a process include high-efficiency mixers such as static and cavity-transfer mixers. Individual components of the composition (or mixtures of components) may, for example, be fed to the mixer by way of a corresponding plurality of separate feed means. Each such feed means may conveniently be an extruder. Such a process has the advantage of preventing or reducing unnecessary contact between co-reactive components of the composition.

In a further form of process, there is a common feed of molten composition to a plurality of atomisers. As another possibility, a plurality of atomisers may be supplied by a corresponding plurality of individual feed means, and the composition supplied to each atomiser may then be the same or different. Instead, two different thermosetting compositions may be fed separately to a single atomiser.

Another possibility comprises simultaneous atomisation of two individual compositions into a chamber in which the atomised compositions are mixed and cooled.

The atomising step of the process of the invention may for example be carried out by rotary atomisation in which the molten powder coating composition impinges on the surface of a rotating member, for example a disc or cup, and atomisation is effected by accelerating a film of liquid by centrifugal energy. The rotating member can, for example, be a sharp-edged flat disc, a shallow inverted bowl, a vaned disc, or a cup without the diverging walls at its open end. A rotating disc may be provided with a plurality of holes (for example, in the form of slots) or may be in the form of a porous barrier or mesh through which the liquid passes, or may be formed with a serrated edge to encourage the formation of ligaments which break down to form atomised droplets producing particles of the desired size. A rotating cup may be mounted on an inclined access, for example at an angle of 15–45 degrees to the horizontal. A preferred rotary cup is of generally conical form, which has been found to give an improved particle size distribution in the product, as compared with the products of conventional comminution processes, in that the atomisation process of the present invention can be conducted so as to restrict very significantly the proportion of product particles that are outside the range of 10 to 120 microns that is generally required for electrostatic spray application of powder coating compositions, thereby avoiding the need for subsequent size classification operations.

In a preferred process, the rotary atomisation is carried out with a rotating cup or bowl, and the molten mixture is introduced into the cup or bowl through a nozzle which terminates at a position below the level of its upper rim to promote steady liquid feed to the centre of the cup or bowl. Such an arrangement has been found to give improved results in terms of the particle size distribution in the solid end product and in terms of increasing the proportion of spherical or near-spherical particles.

Rotary atomisation in accordance with the invention may be assisted by a gas blast (normally introduced in a direction parallel to the axis of rotation of the rotary member) or by electrostatic action.

The atomising process of the invention can alternatively be carried out by so-called two-fluid atomisation in which a high velocity gas stream impinges on a flowing molten powder coating composition to cause formation of an unstable diverging film of the composition, and hence atomisation. The high velocity stream is usually air but, provided that the composition is sufficiently resistant, could be steam to provide an auxiliary heating effect. When air or other gas is used the cooling effect of expansion of the gas on leaving a high velocity nozzle would normally be compensated by some additional heating of the air or gas. The molten powder coating composition can emerge in the form of a jet from an orifice into a high velocity gas stream or the molten composition can flow as a film over a surface before the gas impinges on it. The direction of gas flow can be substantially linear, which generally results in the formation of a flat spray of atomised droplets, or the gas can have a swirling motion which results in the formation of a conical spray of atomised droplets. Examples of two-fluid atomisers are shown in FIGS. 1g to 11 of the paper "Effects of Airblast Atomiser Design upon Spray Quality" by A. K. Jasuja (AGARD paper CP-353). As indicated above, rotary atomisation can be combined with two-fluid atomisation, for example the molten polymer composition can impinge on a rotating disc with high velocity air impinging on the molten film at the edge of the disc, or an apparatus of the type described in DE-A-3326831 can be used.

In a further form of process according to the invention the atomisation is ultrasonic atomisation. Ultrasonic atomisation uses vibrations or sound of frequency at least 18 kHz, for example 20 to 80 or 100 kHz, especially 20–50 kHz. The molten powder coating composition can, for example be caused to flow over the surface of an ultrasonic transducer horn. Alternatively ultrasonic standing wave atomisation can be used in which the molten powder coating composition is caused to flow into the tuned air or gas filled gap between either one ultrasonically vibrating transducer horn and a reflector or two opposed ultrasonically vibrating transducer horns. The melt is preferably delivered to the velocity antinode of the standing wave. Ultrasonic atomisers are described in the paper "New Developments of Ultrasonic Atomisers" presented by L. Bendig at the 4th International Conference on Liquid Atomisation and Spray Systems held in Sendai, Japan, August 1988 (pages 133 to 137 of Conference papers). In particular a standing wave atomiser is described on pages 136 to 137 with reference to FIGS. 11 and 11a. Standing wave atomisers are also described in DE-C-2656330, DE-C-2842232 and EP-A-308600 and such atomisers may be used in the process of the invention. A Hartmann whistle atomiser or twin fluid ultrasonic atomiser uses a high velocity air jet impinging on the open end of a small cavity. Strong oscillating shockwaves are produced in the space between the cavity and the nozzle producing the air jet; the molten powder coating composition is fed to this space.

With regard to the particle size of the product, the relevant parameters will in general depend on the method of atomisation used. Thus, for example, in the case of rotary atomisation the production of particles of smaller particle size will in general be favoured by increasing the speed of rotation of the rotary member, by decreasing the flow rate of the molten composition into the atomiser, and by increasing the diameter of the rotating member.

In the case of ultrasonic atomisation, relevant parameters affecting particle size include the flow rate of the molten composition, the density and surface tension of the molten composition, and the acoustic frequency employed.

In general, it is considered that simple pressure atomisation (for example, using a swirl-jet atomiser) will not be suitable for use with molten thermosetting materials in accordance with the invention, and the atomisation stage of the process of the invention is preferably conducted other than by such atomisation. This arises because such conventional atomisers rely essentially on the production of a fine spray by the propulsion of a liquid at high velocity through a small aperture. Such small nozzle apertures are susceptible to erosion damage and to blocking, and those disadvantages would be expected to be especially serious in the case of a molten thermosetting powder coating composition.

Once the composition has been melt-mixed, it should be maintained in the molten state continuously until atomisation into droplet form is complete and there is advantageously no intervening cooling. Also, to prepare the molten composition for atomising, it will in general be necessary for it to undergo further heating to raise its temperature above the temperature at which the composition leaves a melt-mixing apparatus. Such further heating is preferably carried out in a rapid and penetrative manner, for example, by radio-frequency, microwave or vibrational energy input. Where heating is by more conventional conduction means those skilled in the art will appreciate the advantage of increasing the heat transfer efficiency by increasing where possible either or both the contact area of the heat exchanger and the turbulence of the liquid flow for example by the use of static mixing elements. This heating process is prefer ably applied to the molten composition immediately prior to atomisation or additionally or alternatively within the atomisation device such as, for example, by heating the cup of a rotary atomiser with hot air, induction, infra-red or by more than one such expedient. The purpose of the further heating is to reduce the viscosity of the melt in order to facilitate or permit atomisation, without at the same time causing unacceptable pre-reaction of the composition.

The viscosity of a thermosetting powder coating composition at normal extrusion temperature may be as high as 5000 poise, and it will in general be necessary to effect a substantial reduction in viscosity before atomisation. Typically, the viscosity of the molten mixture immediately prior to atomisation may be in the range of from 2 to 120 poise, advantageously from 5 to 100 poise, preferably from 5 to 50 poise, and more especially from 5 to 30 poise.

The surface tension of the molten mixture immediately prior to atomisation may lie within the range of from 20 to 75 dyne.cm, for example, 30 to 40 dyne.cm. In general, within the indicated ranges, a higher surface tension will favour the production of spherical and near-spherical particles, whilst a lower surface tension will tend to facilitate the atomisation process itself. Accordingly, there will in practice be a balance between those conflicting factors.

Typically, in order to limit undesired pre-reaction, the mixed composition will leave a melt-mixing device such as an extruder at a temperature not exceeding 160° C., for example, in the range of from 90° to 150° C. although the temperature may be as high as 180° C. in the case of certain compositions, for example, a catalyst free feed. In general, the molten mixture will need to be heated to a temperature within the range of from 100° to 300° C. immediately prior to atomisation, preferably from 140° to 250° C., more especially from 160° to 240° C. In principle, within the indicated temperature ranges, it is desirable for the molten composition to attain as high a temperature as possible immediately prior to atomisation. At the same time, however, it is essential to avoid unacceptable pre-reaction of the thermosetting composition, and accordingly there is a balance between the attainable rate of temperature increase and the maximum heat input that can in practice be tolerated prior to atomisation.

It will be appreciated that the temperature profile used in any particular case will depend primarily on the nature of the thermosetting composition.

The time within which significant thermosetting of the composition occurs is a function of the heating process and also varies with the chemical composition of the thermosetting polymer and the crosslinking (curing) agent, and also according to whether any catalyst is used. By way of illustration, in the case of a carboxylic acid-functional polymer used with an epoxy functional crosslinking agent, significant crosslinking occurs at 160° C. after about 20 seconds and at 200° C. after about 5 to 10 seconds. As will be appreciated by those skilled in the art, if cross-linking were to occur to any substantial extent, the gel time of the product composition would be correspondingly reduced, with consequential adverse effects on flow and levelling properties and overall detraction from the appearance of a coating formed from the composition by a powder coating application process. With increasing cross-linking, the effect on gel time would eventually be such that the product composition would not be regarded as suitable for use in powder coating application processes. As an indication of what may be regarded as significant cross-linking, it may be expected that some deterioration in the visual appearance of the coating would be apparent if the gel time were to fall by 20%, that some deterioration in the mechanical properties of the coating would be evident if the gel time were to fall by 40%, and that a material with a gel time reduced by 50% (as compared in each case with the gel time of a powder formed from the same initial composition by conventional comminution processes not involving melt atomisation) would for practical purposes be unusable for powder coating applications.

In the process of the invention, the atomised droplets are caused or allowed to cool to form solid powder particles. Preferably, in order to minimise adherence of the particles to any surface of the apparatus, the temperature of the atomised particles is reduced to a temperature below the softening point of the polymer composition (typically 50° C. or below) before the particles encounter any such surface.

By way of example, the rate of cooling may be such that the atomised particles have cooled to ambient temperature within about 0.5 seconds after formation. Although a relatively rapid rate of cooling is preferable in that it enables a smaller collection vessel to be used, it is also important that the rate of cooling should not be too rapid, otherwise there will be an increasing tendency for the atomised droplets to be of acicular rather than spherical form. For this reason, it may be advantageous to arrange for the material under going atomisation to be exposed to a zone of hot air or other gas, with the object of providing a relaxation period in which the composition—although cooling—is still maintained in molten form. The temperature of introduction of such gas into the atomising vessel may be in the range of from 150° to 350° C., for example, 200° to 250° C.

The velocity of introduction of such hot gas into the atomising vessel should preferably be so chosen as to approximate generally to the flight velocity of the atomising droplets, with the object of entraining the droplets whilst minimising the effects of drag on the droplets which might adversely affect the particle shape of the product. Thus, for example, the gas velocity may typically be in the range of from 5 to 10 meters/second at the onset of droplet formation (that is, at the periphery of the rotating member in the case of rotary atomisation) decelerating to about 1 meter/second at the end of the relaxation zone.

A relaxation zone as described above may be produced by introducing a hot gas so as to impinge on the disintegrating material produced by the atomiser along the direction of droplet flight. Thus, for example, in the case of a rotary atomiser, hot air is advantageously delivered from below as well as from above the plane of the atomiser, so that the resultant flow of hot gas is generally along the said direction.

In atomisation processes involving a stream of high velocity air or gas of which the rapid expansion causes a cooling effect, it may be necessary to provide additional heating to control the cooling rate of the droplets produced. In other atomisation processes a current of a cooling fluid can contact the atomising droplets before they are collected. The cooling fluid may be gaseous or liquid (for example, water) but is conveniently air. The particles formed can, for example be collected on a moving belt or can fall into a receptacle. This receptacle can be the packaging in which the powder coating is to be sold. Alternatively, the powder coating particles may be produced as a fluidised stream in air which is passed to a separator such as a cyclone separator or into a filtration system such as, for example, a so-called "bag house" to recover the product.

Figure 1:
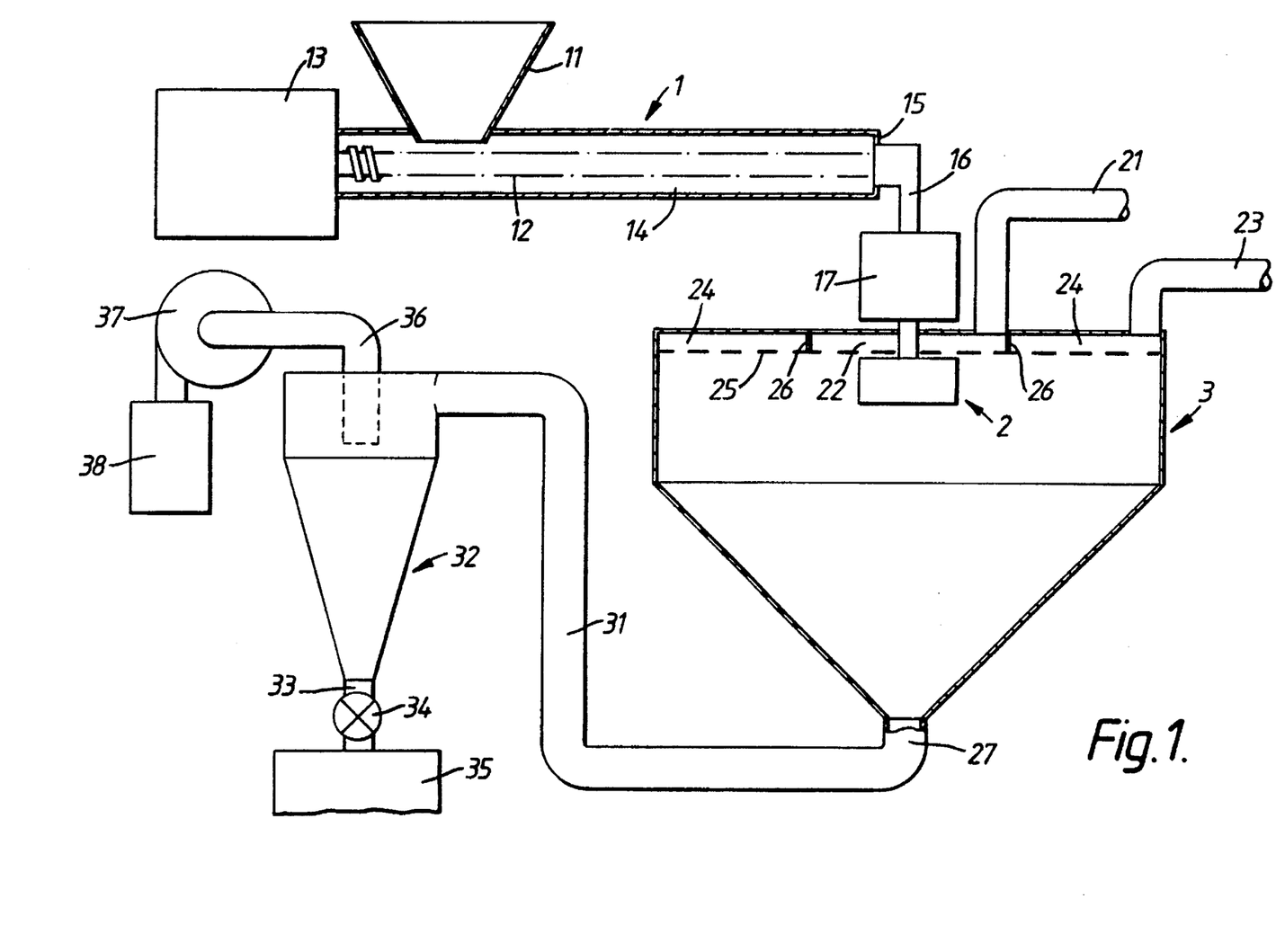
FIG. 1 is a diagrammatic cross-section of an apparatus for performing a process according to the invention.

Several forms of process in accordance with the invention will now be described, by way of example, with reference to the accompanying drawings:

The apparatus of FIG. 1 consists generally of an extruder 1 feeding an atomiser 2 mounted in an atomising chamber 3.

The ingredients of the powder coating composition, that is the thermosetting polymer, the cross-linking agent and any pigments and other additives are pre-mixed and charged to feed hopper 11. Hopper 11 feeds extruder 1 which has a screw 12 driven by motor 13. The extruder has a heating jacket 14 to control the temperature of the polymer composition in the extruder to a temperature at which the polymer is softened but not cured, typically a temperature within the range 90°–180° C., depending on the composition. The polymer composition is thoroughly mixed by screw 12 and is extruded through die 15 into a feed pipe 16 leading to the atomiser 2.

The feed pipe 16 passes through heater 17 in which the polymer composition is rapidly heated, for example by circulating hot air or by radio frequency or microwave heating. The temperature of the polymer composition on exit from the heater 17 can for example be in the range 160°–250° C.

The atomiser 2 is mounted within chamber 3. The atomiser 2 can for example be a rotary cup atomiser such as that of FIG. 2 or that of FIG. 3 or can for example be a standing wave ultrasonic atomiser as described in DE-C-2842232 or EP-A-308600 or a two-fluid atomiser supplied with hot air. The feed pipe 16 terminates in a nozzle or set of nozzles suitable for the atomiser used. Hot air is fed through inlet 21 to the central portion 22 of the chamber 3 so that the feed pipe 16 is surrounded by hot air as it enters chamber 3 to avoid premature cooling of the polymer composition both before and after atomisation. Cold air is fed through an inlet 23 to the peripheral portion 24 of chamber 3. A screen 25 is positioned across the chamber 3 above the level of atomiser 2 to encourage the even distribution of hot air in the central portion 22 of chamber 3 and the even distribution of cold air around the peripheral portion 24 of chamber 3. A circumferentially extending baffle 26 prevents the stream of cold air from inlet 23 from impinging directly on feed pipe 16 or the atomiser 2

The molten polymer composition is atomised by atomiser 2. When a rotary cup atomiser is used the resulting atomised droplets are thrown outwards within chamber 3. After an initial temperature relaxation period whilst the droplets remain under the influence of the hot air curtain from the central portion 22, the droplets rapidly solidify into particles of powder coating composition as they encounter the cold air entering from the peripheral portion 24 of chamber 3. The particles are carried downwards in the stream of air to the outlet 27 at the base of chamber 3.

When a standing wave ultrasonic atomiser is used it is generally arranged so that the ultrasonic field is substantially horizontal. The atomised droplets are projected in all directions normal to the ultrasonic field, including upwards. Air is preferably blown downwards in the region of the ultrasonic standing wave to carry the atomised droplets downwards towards the outlet 27 of chamber 3.

When a two-fluid atomiser is used with air as the atomising fluid additional air is preferably used to cool the droplets and to transport the product towards the outlet 27 of the atomisation chamber 3. When steam is used as the atomising fluid in a two-fluid atomiser water may be sprayed around the peripheral portion 24 of chamber 3. Alternatively, or in conjunction with such water spray, water may be allowed to fall as a film over the inner surface of chamber 3 so as to collect and transport the product particles towards outlet 27.

The outlet 27 of chamber 3 leads through duct 31 to a separator 32, for example a conical cyclone separator. In the separator 32 the particles of powder coating composition are separated from the air stream. The particles of powder coating composition pass downwards to outlet 33 controlled by valve 34 at the apex of the separator 32. The outlet 33 may directly feed packages for the powder coating composition in product collection zone 35 or may feed a hopper for subsequent packaging of the product. The air passes upwardly to upper outlet 36 of separator 32. Flow of air from the separator can be aided by fan 37. The outlet of fan 37 leads to a filter bag 38 which removes any particles of powder coating composition carried by the air stream through outlet 36. Air passes through the filter bag 38 to the surrounding atmosphere.

In cases where steam and water are used as described above, the product from the chamber 3 will be in the form of a slurry and the product particles will be recovered by the use of settling tanks, hydrocyclones, filtration, and/or dried as appropriate.

Figure 2:
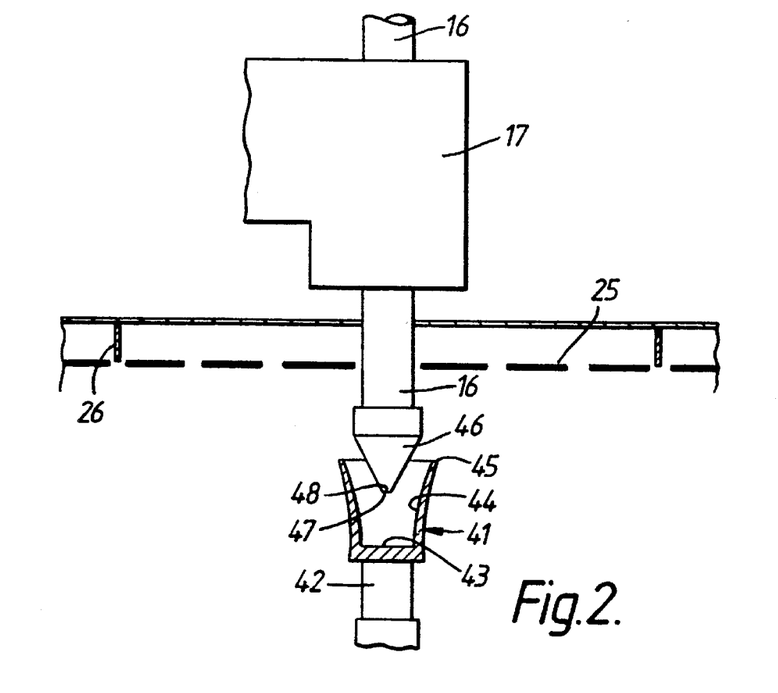
FIG. 2 is a cross-section of one form of rotary cup atomizer suitable for use in the apparatus of FIG. 1.

The atomiser of FIG. 2 comprises a cup 41 mounted on a rotatable spindle 42. The cup 41 has a flat base 43, for example of diameter about 18 mm, and a concave side wall 44 of height about 25 mm with an upper lip 45 of diameter, for example about 30 mm. The feed pipe 16 leading from extruder 1 (FIG. 1) terminates in a nozzle 46 of generally conical shape flattened at its tip 47 and having an outlet orifice 48. The nozzle 46 is mounted so that its orifice 48 is below the lip 45 of cup 41 but with a clearance of, for example 15 mm between the tip of the nozzle 46 and the base 43 of cup 41.

Figure 3:
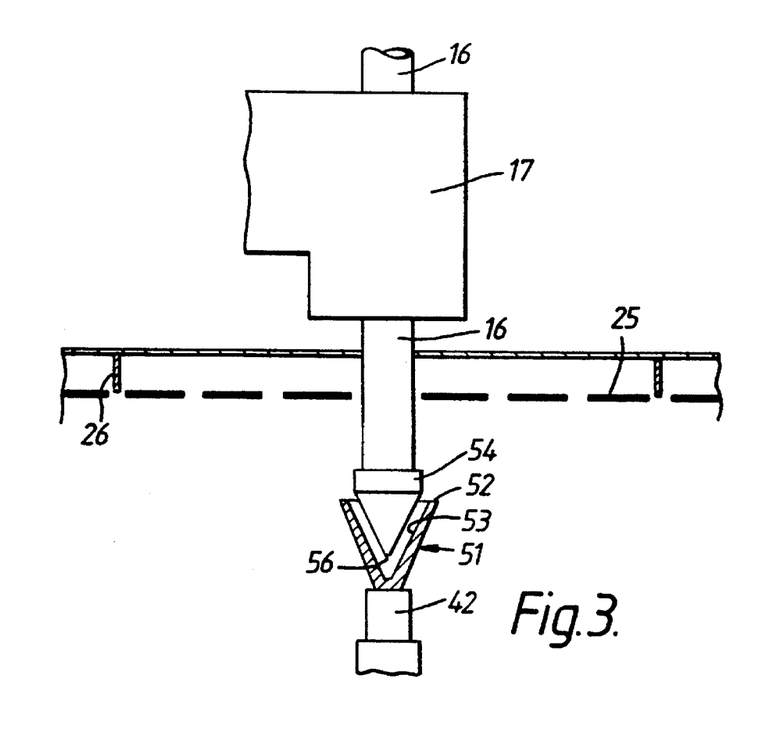
FIG. 3 is a cross-section of an alternative form of rotary cup atomizer suitable for use in the apparatus of FIG. 1.

The atomiser of FIG. 3 comprises a cup 51 mounted on rotatable spindle 42. The cup 51 is of conical shape, for example with an internal depth of about 20 mm and a diameter at the rim 52 of about 35 mm. The nozzle 54 at the end of feed pipe 16 for use with cup 51 is of conical shape and of similar cone angle to cup 51 so that the face of nozzle 54 is substantially parallel to the side walls 53 of cup 51. The nozzle 54 is positioned with its outlet orifice 56 below the rim 52 of cup 51. The tip of nozzle 54 can, for example be about 7 mm from the apex of cup 51.

The speed of rotation of the cup 41 or 51 in the apparatus of FIG. 2 or FIG. 3 can for example be in the range 5,000 to 30,000 r.p.m..

Figure 4:
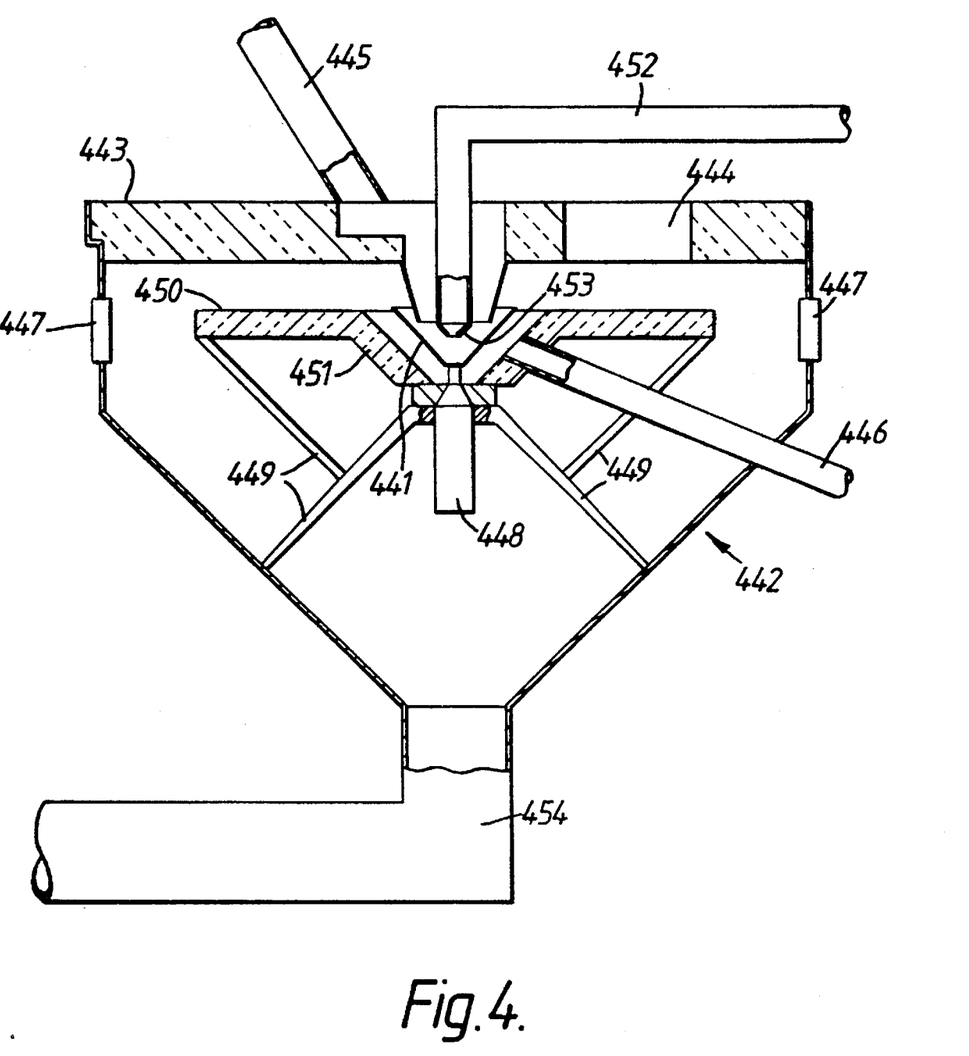
FIG. 4 is a cross-section, partly in a diagrammatic form, of an apparatus including a modified form of atomizer provided with an additional hot air inlet.

Referring to FIG. 4 of the accompanying drawings, the apparatus comprises a rotary cup atomiser 441 mounted within a chamber 442 provided with an insulating lid 443 and an inspection window 444.

The chamber 442 has an upper hot air inlet 445, a lower hot air inlet 446, and a circumferentially extending cold air inlet 447.

The rotary cup atomiser 441 is in the form of an inverted cone and is rotated by a motor 448 driven by compressed air. The atomiser and motor are mounted on a gantry 449, which also supports an annular plate 450 which is formed of a thermally insulating material and has a truncated conical portion 451 depending centrally therefrom.

In operation, a molten thermosetting powder coating composition (prepared, for example, in an extruder) is passed along a feed pipe 452 to a nozzle 453. The feed pipe may be provided with a heater (not shown), for example, a tape heater, and there are additional heating means (not shown) arranged to act immediately upstream of the nozzle 453.

The upper hot air inlet 445 opens into a manifold which surrounds the nozzle 453. Hot air introduced in this way serves to heat the atomiser cup as well as to assist in providing a temperature relaxation zone as described hereinbefore.

The lower hot air inlet 446 opens into the truncated conical portion 451 surrounding the conical rotary cup 441. Hot air introduced in this way serves to heat the atomiser cup as well as to assist in providing a temperature relaxation zone as described hereinbefore.

In operation, atomisation of the coating composition takes place by centrifugal energy at and immediately beyond the periphery of the rotating cup 441. The atomised droplets so formed are thrown outwards across the annular plate 450 and are exposed immediately to the hot air flow from the lower hot air inlet 446. The result is to form a temperature relaxation zone across the annular plate 450, thereby limiting the rate of cooling of the atomised droplets before they encounter the cold air from the inlet 447. The effect of the relaxation zone is to increase the spherical character of the product particles.

The product particles have cooled to a temperature below the softening temperature before they encounter the wall of the chamber 442, and leave the chamber by way of outlet 454 for further handling as described above with reference to FIG. 1.

The following series of experiments illustrate the principle of the process of the invention:

A series of experiments was carried out on atomising a pigmented carboxylic acid-functional polyester of melting point about 120° C. and Tg 60° C. using the apparatus of FIGS. 1 to 3. The polyester composition was extruded at an exit temperature of 150° C. The chamber 17 surrounding the feed pipe 16 was heated by air at a temperature of 250° C. The temperature of the polyester composition after leaving the heating chamber 17 was about 200° C. The results are shown in the following Table:

| | | | | |
|---|---|---|---|---|
| Type of cup used | FIG. 2 | FIG. 2 | FIG. 3 | FIG. 3 |
| Type of nozzle used | FIG. 3 | FIG. 2 | FIG. 3 | FIG. 3 |
| Cup speed (rpm) | 10000 | 10000 | 10000 | 10000 |
| Polymer composition flow rate (g/Min) | 6.5 | 6.5 | 6.5 | 2.6 |
| % of spherical particles (aspect ratio less than 2:1) | 70 | 85 | 65 | >95 |
| Mean diameter of particles (microns) | 85 | 75 | 85 | 75 |
| Maximum diameter of particles (microns) | 150 | 130 | 190 | 125 |
| Minimum diameter of particles (microns) | 45 | 25 | 25 | 30 |

The following Examples illustrate the process of the invention.

The following formulations were used, all percentages being by weight:

| Formulation A [AM D-3 and AM D-5] - Polyester/Epoxy hybrid | |
|---|---|
| TITANIUM DIOXIDE (Pigment) | 20.6% |
| BLANC FIXE (Extender) | 18.2% |
| MICROCARB 40* | 2.0% |
| C-MOXY-FUNCTIONAL POLYESTER RESIN (Acid Value 33–35) | 42.3% |
| DER 671 EPOXY RESIN** | 16.3% |
| WAX | 0.3% |
| BENZOIN (de-gassing agent) | 0.3% |
| *MICROCARB 40 is a calcium carbonate extender | |
| **DER 671 is a bisphenol-A/epichlorohydrin epoxy resin | |

| Formulation B [AM D-6] - Epoxy | |
|---|---|
| TITANIUM DIOXIDE (Pigment) | 35.0% |
| DOW DER642U EPOXY RESIN* | 61.2% |
| BYK 36OP FLOW AID | 0.4% |
| DEH 40 CROSSLINKER** | 3.1% |
| BENZOIN (degassing agent) | 0.3% |
| *DER 642U is a bisphenol-A epoxy/novolak resin | |
| **DEH 40 is a dicyandiamide epoxy curing agent | |

| Formulation C [AM D-7] - Polyester/Isocyanate | |
|---|---|
| TITANIUM DIOXIDE (Pigment) | 33.3% |
| HYDROXY-FUNCTIONAL POLYESTER (Hydroxyl number: 38–45) | |
| VESTAGEN B 1530 (Curing agent)* | 13 |
| BYK 630P (Flow aid) | 0.4% |
| BENZOIN (de-gassing agent) | 0.2% |
| *VESTAGEN B 1530 is a caprolactam-blocked isocyanate curing agent | |

| Formulation D [AM D-8] - Polyester/Primid | |
|---|---|
| CARBOXY-FUNCTIONAL POLYESTER (Acid Value: 35–37) | 93.5% |
| PRIMID XL 552* (Curing agent) | 5.2% |
| MODAFLOW (Flow aid) | 1.0% |
| BENZOIN (de-gassing agent) | 0.3% |
| *PRIMID XL 552 is a hydroxyalkylamide curing agent | |

II. Experimental procedure

In each experiment the ingredients of the corresponding formulation were pre-mixed in a blender and metered into a single-screw extruder operating at between 70° and 130° C. so as to produce a steady outflow of the composition in molten form. The molten material was piped to an apparatus as shown in FIG. 4 by way of feed pipe 452.

The nozzle 453 of the atomising device of the apparatus was maintained at a temperature of 350° to 400° C., resulting in the molten material leaving the nozzle being at the feed temperature shown in Table 1 below. The speed of rotation of the atomising cup 441 was in the range of 10,000 to 15,500 as shown in Table 1. Hot air was introduced through the upper air inlet 445 and the lower air inlet 446 at the temperatures shown in Table 1.

The product powder was analysed by standard techniques and the results are shown in Table 2 below.

TABLE 1

| Expt. No. | Formulation | Air temperature Upper °C. | Air temperature Lower °C. | Cup rotation × 1000 | Feed rate Kg/h | Feed Temp °C. |
|---|---|---|---|---|---|---|
| 1.1 | A | 200 | 200 | 12 | 1.0 | 200 |
| 1.2 | A | 250 | 250 | 12 | 1.0 | 210 |
| 2.1 | A | 250 | 180 | 15 | 1.0 | 230 |
| 2.2 | A | 250 | 230 | 15 | 3.0 | 210 |
| 3.1 | B | 205 | 202 | 15.5 | 2.0 | 160 |
| 3.2 | B | 190 | 190 | 15 | 3.0 | 160 |
| 4.1 | C | 190 | 125 | 14.7 | 3.0 | 210 |
| 4.2 | C | 235 | 235 | 14.8 | 3.0 | 210 |
| 5.1 | D | 214 | 210 | 15 | 2.0 | 190 |
| 5.2 | D | 230 | 238 | 15 | 3.0 | 210 |

In order to provide a basis for comparison, Table 2 also shows (marked "S") the results of the same analyses conducted on powder coating compositions corresponding to formulations A to D but prepared by conventional micronising procedures.

TABLE 2

| Expt. No. | Formulation | Mean Particle Size Microns | Tg Onset °C. | Gel Time Seconds | Pellet Flow mm | Gloss (60°) % |
|---|---|---|---|---|---|---|
| 1s | A | 39.1 | 49.1 | 156 | 66 | 85 |
| 1.1 | A | 64.6 | 51.3 | 162 | 44 | 87 |
| 1.2 | A | 66.3 | 51.1 | 143 | 47 | 84 |
| 2s | A | 38.1 | 49.1 | 156 | 66 | 85 |
| 2.1 | A | 64.1 | 45.2 | 148 | 47 | 88 |
| 2.2 | A | 70.0 | 44.1 | 151 | 57 | 87 |
| 3s | B | 34.3 | 49.2 | 11 | 55 | 86 |
| 3.1 | B | 70.5 | 55.4 | 2 | 9 | 48 |
| 3.2 | B | 73.0 | 53.4 | 13 | 53 | 87 |
| 4s | C | 35.8 | 43.5 | 133 | 77 | 80 |
| 4.1 | C | 83.0 | 50.7 | 142 | 73 | 79 |
| 4.2 | C | 73.2 | 42.5 | 138 | 68 | 75 |
| 5s | D | 37.2 | 61.7 | 88 | 103 | 82 |
| 5.1 | D | 63.8 | 60.2 | 83 | 61 | 52 |
| 5.2 | D | 55.5 | 61.7 | 80 | 102 | 90 |

III. Analytical Techniques

(a) Particle Size

The particle size data are based on observations made using a Galai Cis-1 particle size analyser using surfactant and ultra-sound for dispersion of the sample in water.

(b) Tg

The Tg data are based on observations made using a Du Pont 910 differential scanning calorimeter with a Du Pont 2000 thermal analyser.

(c) Gel Time

The gel time is the time at which the product appears to become an elastic solid when heated at 200° C.

(d) Pellet Flow

For this test a pellet of volume 0.47 ml is formed from the product composition and is pressed on to a metal plate inclined at an angle of 60° C. The plate bearing the pellet is then heated in an oven at 150° C. for 30 minutes, and the distance through which the composition has flowed down the plate in that time is measured in mm.

(e) 60° Gloss

The 60° gloss data are based on observations using a Labor Reflectometer.

IV. Discussion

In terms of the various relevant parameters, and especially gel time, the results set out in Table 2 show, with the exception of Experiment 3.1, that the product compositions obtained by melt atomisation processes according to the invention were acceptable for use in powder coating application processes.

Following the unsatisfactory result obtained in Experiment 3.1, the process conditions were varied, in Experiment 3.2, by reducing the air temperature and increasing the feed rate of the molten material to the atomising device, thereby reducing both the residence time of the material in the device and the total heat input to the material during the process. As a result of taking those measures in accordance with the general information given hereinbefore concerning the practice of the present invention, it will be seen that a satisfactory product was then obtained using the same composition formulation as in Experiment 3.1.

V. Molecular Weight Studies—Gel Permeation Chromatography

The following Table 3 shows the number average molecular weight [Mn], the weight average molecular weight [Mw], the volume average molecular weight [Mz] and the dispersity factor [ratio of Mw:Mn] as determined by gel permeation chromatography for the products of Experiments 2.1 and 2.2 as described above, together with the corresponding data for the standard comparison material [designated "2s"] of the same formulation.

TABLE 3

| Experiment No. | Mn | Mw | Mz | Dispersity |
|---|---|---|---|---|
| 2s | 1483 | 7753 | 18614 | 5.3 |
| 2.1 | 1283 | 7773 | 18130 | 6.1 |
| 2.2 | 1446 | 7881 | 20120 | 5.5 |

It is considered that, within the limits of experimental error, the figures given in Table 3 show no significant variation in molecular weights as between the standard comparison product and the corresponding products obtained by the melt atomisation process of the invention.

VI. Assessment of Particle Shade

Figure 5:
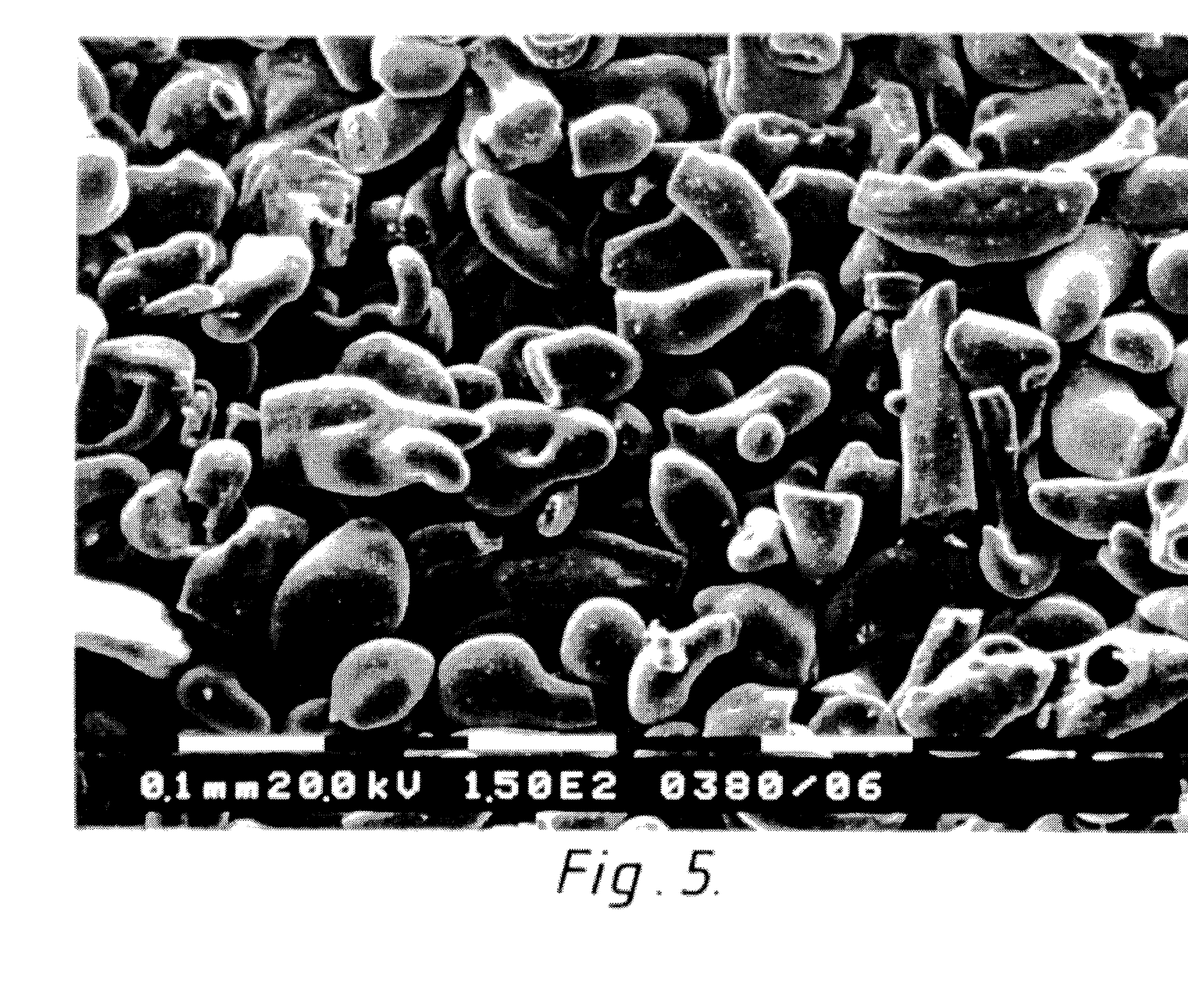
FIG. 5 is an electron micrograph of a sample of the product of the invention.
Figure 6:
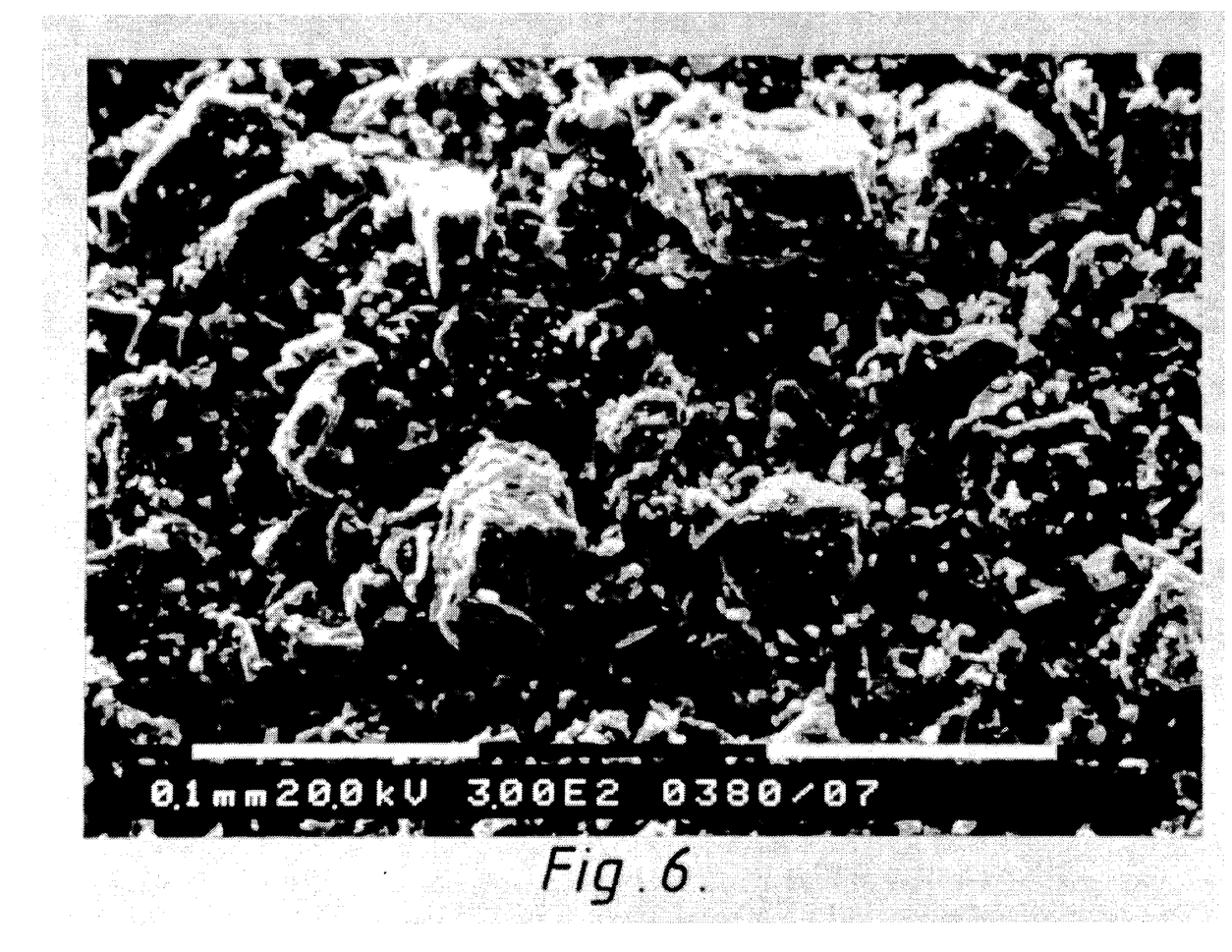
FIG. 6 is an electron micrograph of a sample of the product obtained by a conventional comminution process.

FIGS. 5 and 6 of the accompanying drawings reproduce respectively electron micrographs of a sample of the product of Experiment 1.1 in accordance with the invention and of the corresponding standard comparison material (designated "1s").

It is apparent from the electron micrographs that the product obtained in accordance with the invention (Experiment 1.1, FIG. 5) shows a much reduced content of fine particles and a narrower size distribution generally, as compared with the standard comparison product obtained by conventional comminution processes, and also contains a high proportion of particles of a rounded shape.

We claim:

1. A process for the manufacture of a thermosetting powder coating composition, which comprises:
   (a) forming a molten mixture of a film-forming polymer containing reactive functional groups, a curing agent for said polymer and optionally one or more coloring agents, the composition being formed without addition of solvent and having a residual solvent content not exceeding 1.0% by weight derived from manufacture of any of the ingredients;
   (b) atomizing the resulting melt into droplet form, the temperature of the molten mixture immediately prior to atomization being in the range of from 100° to 300° C.; and
   (c) causing or allowing the atomized droplets to cool to form solid powder particles,
   whereby significant thermosetting of the composition during the process is avoided such that the gel time is reduced no more than 40% as compared with the gel time of a powder formed from the same composition prepared by a comminution process, and the product composition is suitable for application as a powder coating.

2. A process according to claim 1, wherein the melt is atomised by rotary atomisation.

3. A process according to claim 2, wherein the rotary atomisation is carried out with the use of a rotary cup of generally conical form.

4. A process according to claim 2, wherein the rotary atomisation is carried out with a rotating cup or bowl, and the molten mixture is introduced into the cup or bowl through a nozzle which terminates at a position below the level of its upper rim.

5. A process according to claim 1, wherein the melt is atomised by two-fluid atomisation.

6. A process according to claim 1, wherein the melt is atomised by ultrasonic atomisation.

7. A process according to claim 1 wherein the composition undergoing atomisation is exposed to a current of a hot gas.

8. A process according to claim 1 wherein one or more currents of hot gas, impinge on the composition undergoing atomisation along the direction of droplet flight.

9. A process according to claim 1 wherein after melt-mixing the composition is maintained in the molten state continuously until atomisation into droplet form is complete.

10. A process according to claim 9, wherein the molten composition does not cool to any substantial extent between melt-mixing and atomisation.

11. A process according to claim 1 wherein the molten composition is subjected to further heating immediately prior to atomisation.

12. A process according to claim 11, wherein the said further heating is effected by radio-frequency, microwave or vibrational energy input.

13. A process according to claim 1 wherein the temperature of the molten composition immediately prior to atomisation is in the range of from 140° to 250° C.

14. A process according to claim 1 wherein the composition is melt-mixed in an extruder.

15. A process according to claim 1 wherein the temperature of the molten composition leaving the melt-mixing device does not exceed 160° C.

16. A process as claimed in claim 1 wherein a catalyst for the curing section is injected directly into the atomiser, so as to be mixed with the molten film-forming polymer before the onset of droplet formation.

17. A process as claimed in claim 1 wherein at least a proportion of the curing agent is injected directly into the atomiser, so as to be mixed with the molten film-forming polymer before the onset of droplet formation.

18. A process as claimed in claim 1, wherein the film-forming polymer is selected from the group consisting of carboxy-functional polyester resins, hydroxy-functional polyester resins, epoxy resins, and fictional acrylic resins.

19. A process according to claim 1 wherein the curing agent is itself a polymeric material.

20. A thermosetting powder coating composition made by a process as claimed in claim 1.

21. A process according to claim 7 wherein the hot gas is air.

22. A process according to claim 8 wherein the hot gas is air.

23. A process according to claim 13 wherein the temperature of the molten composition immediately prior to atomisation is from 160° to 240° C.

24. A method of forming a coating on a substrate which comprises the steps of:
   (1) applying to a substrate by a powder coating process a thermosetting powder coating composition prepared by (a) forming a molten mixture of a film-forming polymer containing reactive fictional groups, a curing agent for said polymer and optionally one or more coloring agents, the composition being formed without addition of solvent and having a residual solvent content not exceeding 1.0% by weight derived from manufacture of any of the ingredients; (b) atomizing the resulting melt into droplet form, the temperature of the molten mixture immediately prior to atomization being in the range of from 100° to 300° C.; and (c) causing or allowing the atomized droplets to cool to form solid powder particles, whereby significant thermosetting of the composition during the process is avoided such that the gel time of the powder is reduced no more than 40% as compared with the gel time of a powder formed from the same composition prepared by a comminution process; and
   (2) heating the thus applied composition to melt and fuse the particles on the substrate and cure the coating.

* * * * *